United States Patent [19]

Gates

[11] 4,005,932
[45] Feb. 1, 1977

[54] PHOTOGRAMMETRIC APPARATUS, METHODS OF USE, AND PRODUCTS PRODUCED THEREBY

[76] Inventor: Jackson Gates, P.O. Box 145, Kylertown, Pa. 16847

[22] Filed: Mar. 12, 1975

[21] Appl. No.: 557,612

[52] U.S. Cl. .................................. 353/6; 33/1 A; 156/58; 156/59; 350/117; 355/22; 356/2
[51] Int. Cl.² ................ G03B 21/00; G03B 21/56; G01C 11/12
[58] Field of Search .............. 355/22; 353/5, 6; 356/2; 33/1 A; 350/117; 156/58, 59

[56] References Cited

UNITED STATES PATENTS

| | | | |
|---|---|---|---|
| 2,100,148 | 11/1937 | Parker | 350/117 |
| 2,309,752 | 2/1943 | Cooke | 356/2 |
| 2,643,576 | 6/1953 | Merriam | 356/2 |
| 3,140,347 | 7/1964 | Cohen | 352/85 |
| 3,894,802 | 7/1975 | Higgins | 356/2 |

FOREIGN PATENTS OR APPLICATIONS

| | | | |
|---|---|---|---|
| 543,024 | 9/1959 | Belgium | 350/118 |
| 778,124 | 2/1968 | Canada | 350/120 |
| 360,586 | 4/1962 | Switzerland | 350/120 |

*Primary Examiner*—Steven L. Stephan
*Attorney, Agent, or Firm*—Steele & Petock

[57] ABSTRACT

Photogrammetric method and apparatus comprising a flexible platen used with standard stereo plotting instrumentation such as double-projection direct-viewing plotting instruments. The purpose of said flexible platen is to provide an absolute stereo image for photographic and other purposes. The flexible platen which is of sufficient size to provide a meaningful mapping surface is vertically adjustable at a multiplicity of points by mechanical, pneumatic, electro-mechanical, fully automated, or other means to provide an actual model-like three-dimensional photographic surface to enable relief distortion from the aerial photographs to be effectively eliminated in planimetric photographs which are taken of the adjusted flexible platen upon which the aerial images are projected. Additionally, an orthostereoscopic photo can be produced by the use of color film.

In another embodiment, a video system may be utilized with the flexible platen to provide orthophotographs and orthostereoscopic photos from United States Geographic Service topographic photographs.

In addition to various types of photographs and contour maps, actual relief models can be produced from the apparatus disclosed herein.

14 Claims, 12 Drawing Figures

PHOTOGRAMMETRIC APPARATUS, METHODS OF USE, AND PRODUCTS PRODUCED THEREBY

BACKGROUND OF THE INVENTION

1. Field of the Invention

In the art of photogrammetry, aerial photographs are taken to cover areas of the earth, and relief distortion which occurs must be eliminated to provide accurate topographic and planimetric maps. This art of preparing such topographic and planimetric maps is popularly known as photogrammetric stereo map plotting. Photogrammetric principles are also utilized in numerous fields to solve problems of mensuration requiring both absolute and relative determinations of size, shape, depth, height and location of objects in their environment. Archaeology, livestock evaluation, medical examinations are but a few such fields, and the utility of the subject invention is not to be considered limited to map-making usage herein described in detail.

Further, by utilizing the apparatus and techniques of the subject invention, actual relief models may be conveniently constructed and utilized for planning purposes or otherwise.

2. Prior Art

Photogrammetric stereo plotters generally in use today comprise a pair of overhead projectors which are utilized to project stereo images from a pair of diapositives into the space above the mapping surface. More precisely, in standard double-projection direct-viewing plotting systems, the images on the diapositives derived from original aerial negatives are illuminated and projected through lenses onto a platen where the projected image is viewed by reflective light.

The projectors are provided with rotational (about each of three mutually perpendicular axes) and linear translational motions to permit the same relative spatial orientations of said projectors above the mapping surface as the orientation of the aerial camera above a specified datum at the instant the aerial photographs were taken. When the projectors are oriented, the light rays from the common images intersect at a point above the mapping surface and thus by pinpointing the intersection of all common image points, a three-dimensional spatial model is created.

A movable platen, which can be vertically adjusted to a position where the common image points intersect, is utilized above a tracing table which forms the mapping surface. The platen is usually a round metal member about 4" in diameter which has a reference mark located on its center, which appears to float in the stereoscopic model. When the floating mark is brought into contact with any point of the apparent surface of the model as viewed on the platen, the precise position of that image is established and can be pinpointed with distortion-free accuracy on the tracing table below. The platen can be guided freely through the stereo model by the plotter operator while maintaining the floating mark in contact with the surface of the model at the point of observation. Thus, by such a method, maps may be plotted by pencil or other means as the various relief and other map features are observed in the locations designated by the image intersections.

By establishing reference points, the exact height of various terrain features can be determined and contour maps created by utilizing the above described platen with its reference mark which may be a hole in the platen which enables the omission of light from beneath to create the intersection of the images. As the light is followed, the plotter operator, with the use of three-dimensional glasses, effectively has a three-dimensional model before him and can follow the light dot enabling him to plot contours effectively reproducing the three-dimensional image as a two-dimensional image.

In addition to manual plotting, an electronic system such as the system known as ORTHOPHOTO also is utilized for map plotting wherein the need for manual planimetric plotting is eliminated. With this method, a flexible lens is utilized and the image is transferred onto a tape by computers, or onto a sensitized film.

In the case of the manual plotting, the map making process is extremely slow, and the skill and accuracy of the plotter operator are of considerable significance. While the ORTHOPHOTO electronic system eliminates some of the need for plotter operator skills and reduces the time necesary for map plotting, the cost of such a system is prohibitive for many organizations. Maintenance costs add to the burden of the expense for an electronic system.

In manual planimetric plotting, details such as buildings are occasionally inadvertently eliminated, and mistakes such as plotting of shadows sometimes occur.

SUMMARY OF THE INVENTION

It is an object of the subject invention to provide improved means for eliminating relief distortion in the preparation of planimetric and topographic maps prepared from aerial photographs.

It is another object of the subject invention to provide a photogrammetric stereo map plotting system in which, while high accuracy is maintained, production time largely due to extensive manual plotting is reduced by eliminating the necessity of plotting.

It is still another object of the subject invention to provide a photogrammetric stereo map plotting system where costs of electronic systems heretofore commercially used, such as ORTHOPHOTO, can be avoided, but where high accuracy can nevertheless be achieved.

It is still another object of the subject invention to provide a photogrammetric stereo map plotting system where the use of standard complex electronic equipment heretofore commercially used, such as ORTHOPHOTO, is eliminated and further, the need for highly skilled map plotting is minimized by providing a relatively simple operational scheme.

Still another object of the subject invention is the production of an actual, rather than apparent, stereo model to permit rephotographing of the original aerial photographs without relief distortion, thereby creating a photograph in which the displacements of images due to tilt and relief have been removed. This is commonly known as an orthophotograph.

A related object of the subject invention is to create a photograph in which the displacements of images due to tilt and relief have been removed and which is, in addition, a three-dimensional photograph. This type of photograph displays an orthostereoscopic image hereinafter referred to as an orthostereoscopic photograph.

Another object of the subject invention is to provide a method and means to create relief models.

Still another object of the subject invention is to provide a related means and method of producing orthophotos and orthostereoscopic photos from U.S.G.S. topographic maps and the like.

Accordingly, in place of the small inflexible metal platen which is used to provide the means of pinpointing features on a tracing table below, the subject invention calls for the use of a large flexible platen which itself becomes a mapping surface. The need for the standard tracing table below the platen is eliminated as the corrected image is formed into a three-dimensional model which can then be photographed or otherwise used to advantage. The improved subject system is provided with the means of vertically aligning the flexible platen throughout so that the corrected image from the two diapositives (when a double-projection system is used) is achieved throughout the system at every point of adjustment. The vertical adjustment capability can be by mechanical, pneumatic, light-seeking, electromechanical or other means in which, at each designated point, the operator has the capability of raising that particular part of the flexible platen. For example, vertical rods may be placed at one-half inch intervals in a grid pattern, with the rods being raised and lowered by horizontal connecting levers having motion translation means such as cam surfaces. Thus, the operator can adjust the points by moving the horizontal levers which extend along at least one side of the flexible platen model. Standard techniques may otherwise be used and the correct elevation will be achieved when the red and blue-green images are seen to coincide to form the necessary bluish-red combination.

Accordingly, the flexibility of the platen which may be of rubber construction or the like, permits it to match the actual terrain conditions to produce the stereo image and provide absolute control. Once the stereo image is correctly produced, instead of creating the image below on paper or other means such as film or the like, an overall three-dimensional actual model is created. Once the projected image is achieved, it is rephotographed, which effectively changes the three-dimensional actual model to a two or three-dimensional photograph which is absolutely oriented and distortion-free. At this time, the scale factor may be changed as the negative base provides for flexibility and rephotographing. Thus, for example, a planimetric product may be readily achieved and the resultant negative enlarged to whatever scale is desirable. The number of vertical adjustment points depends on the accuracy desired and the purpose of the finished product.

When color film is used to produce a three-dimensional photograph which is designated an orthostereoscopic photo, this photo, in effect, constitutes a geometrically accurate model having no distortion of perspective with the two visually fused images producing a unitary spatial picture corrected to horizontal and vertical control. The orthostereoscopic photo may be used in novel types of orthostereoscopic projection and plotting equipment which are beyond the scope of the subject disclosure. Through the use of the orthostereoscopic projection and plotting equipment, contour maps can be produced from the orthostereoscopic photo or slide.

In addition to using the flexible platen for the production of orthophotographs and orthostereoscopic photographs, the platen may also be used as a mold for producing actual relief models. Foam or other types of substance may be sprayed or otherwise applied onto the flexible platen after it has been adjusted to create the distortion-free model from the diapositives and once the foam or other substance hardens, it may be removed in tact and utilized for planning purposes, such as for highway studies and the like.

In another embodiment disclosed herein, a video system used in conjunction with the flexible platen provides a means of producing orthophotos or orthostereoscopic photos from aerial photos such as U.S. Geographic Service topographical photographs. In this operation, the slide or print topographical photo is placed on a projecting means such as in an opaque overhead projector and projected onto the flexible platen, and adjustments are made for the approximate horizontal control scale. An overlay sheet is prepared and placed on a TV screen which receives the image from the flexible platen by means of a TV camera. Adjustments are then made to the flexible platen to correlate the photo images with the control plotted data, and a copy camera may be utilized to photograph the image on the flexible platen after adjustments for all field data and the like have been made to the TV screen overlay. An orthophoto thus results.

DETAILED DESCRIPTION

Figures 1, 2:
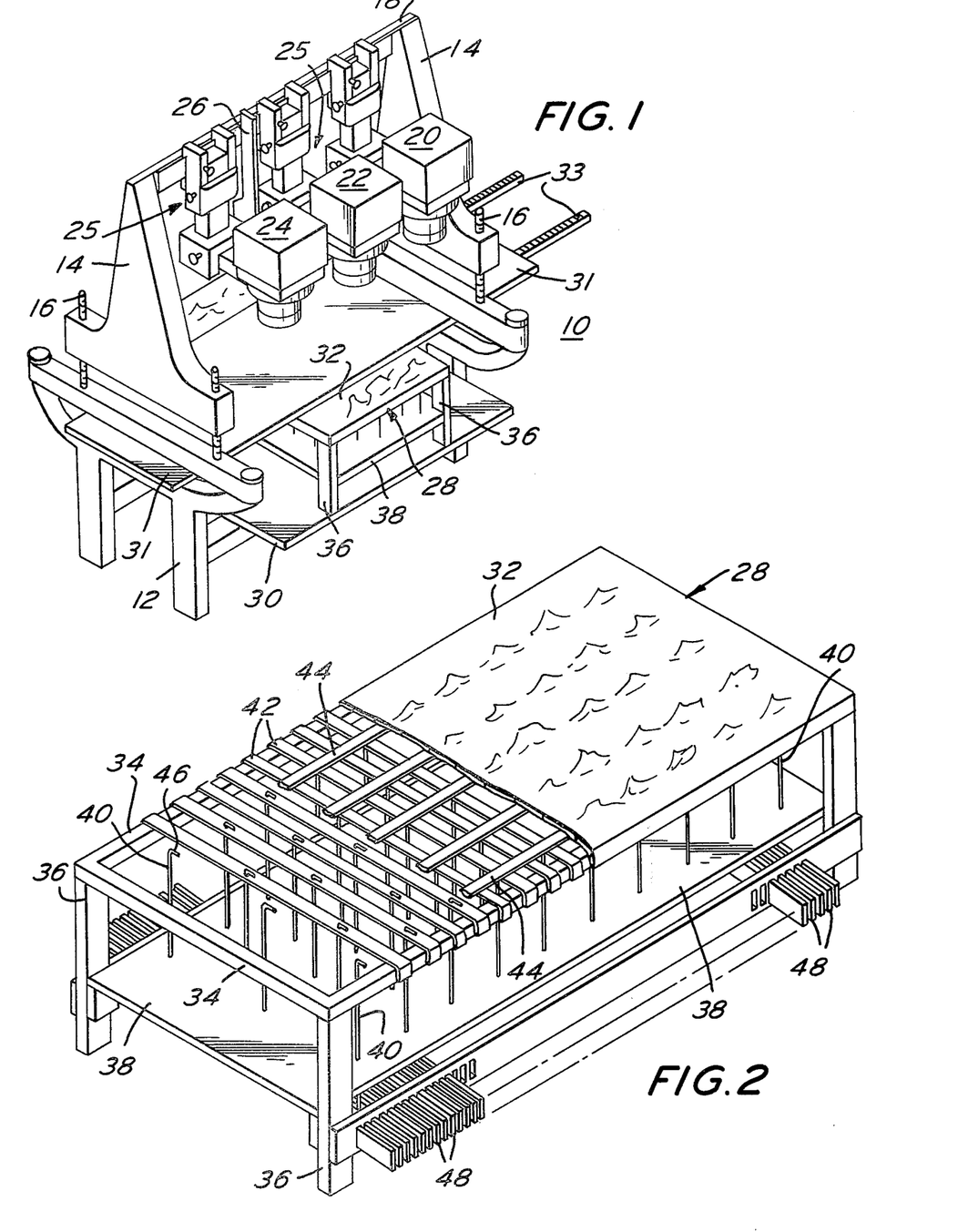
FIG. 1 is a perspective view illustrating the photogrammetric stereo map plotting system of the subject invention.
FIG. 2 is a perspective view in partial breakaway illustrating the construction of the flexible platen apparatus.

With reference to FIG. 1, a stereo map plotter 10 is disclosed having base frame members 12 which support projector frame structure 14 and which is adjustable by threadable adjustment means 16. The horizontal member 18 of the projector frame structure carries three projectors 20, 22 and 24, any two of which may be utilized at a time, to illuminate and project images from a pair of diapositives to the space below the projectors.

Each of the projectors 20, 22 and 24 is provided with rotational and linear translational motions to achieve the same orientation of the projectors as the aerial cameras from which the diapositives were produced. Thus, the projector mounts schematically shown as 25 are therefore constructed so that each projector 20, 22 and 24 may be rotated about each of three mutually perpendicular axes. While double-projection direct-viewing projectors such as the popular multiplex type of projectors may be used, the subject invention is not to be construed as being limited to this type of projection system.

A camera 26 is also extended from the horizontal member 18, the purpose of which is to photograph images below, once the corrected condition is achieved.

The flexible platen apparatus is designated generally as 28 and is supported by lower support member 30.

A rigid adjustment surface 29, the purpose of which will be subsequently described is shown slideably mounted on tracks 31.

With reference to FIG. 2, one embodiment of the flexible platen apparatus 28 comprises a flexible platen 32 which may be a suitable synthetic or natural rubber or plastic composition. An example of a suitable material is PUREGUM. The flexible platen 32 is attached peripherally to horizontal support member 34 by any acceptable means, and may be so attached in a relaxed state or slightly under tension. The elasticity of the flexible platen 32 must be sufficient to permit the vertical adjustment of the platen at a multiplicity of points as will be described. Vertical support members 36 support the horizontal support members 34 and also are used to position and support lower frame member 38 which may or may not be necessary, depending on the type of vertical adjustment means. Vertical adjustment rods 40 are positioned jointly by the lower frame member 38 and cross member strips 42 which may be relatively flexible elastic members which are secured to the horizontal support member 34. Additional cross strips 44 may be arranged perpendicularly to cross member strips 42 and are used to further stabilize the position of the upper portion of the vertical adjustment rods 40 which are secured to cross member strips 42 by their horizontally bent tops 46 or other suitable means. The flexible platen 32 may be secured to strips 42 and 44 by adhesive or other means. Adjustment levers 48, the purpose of which will be subsequently described, extend from beneath the lower frame member 38 as shown in FIG. 2. It is to be clearly understood that the support means for the flexible platen 32 described above is by way of example only and that many suitable variations may be utilized with the important criterion being to enable the rapid, accurate adjustment of the platen 32 to desired positions which are retainable for a desired period of time.

Figure 3:
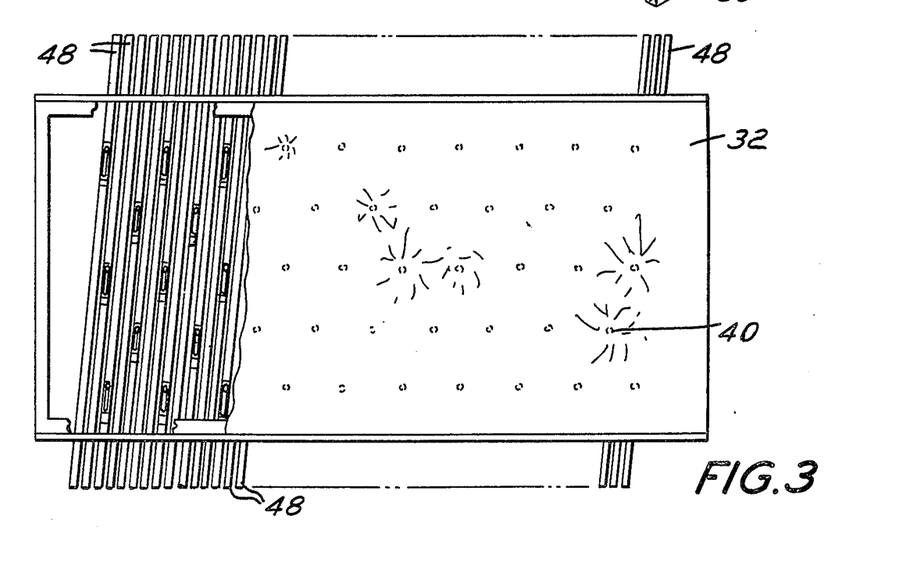
FIG. 3 is a top view of the flexible platen apparatus and shows a series of inclined cam surfaced horizontal levers which are used as the adjustment means for the flexible platen.
Figure 4:
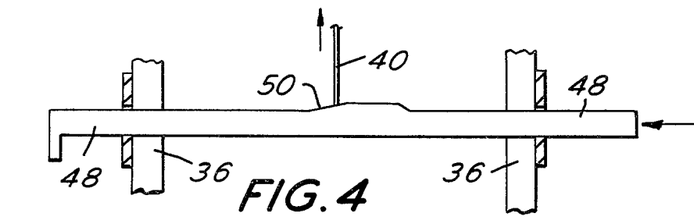
FIG. 4 illustrates a single lever mechanism used for the vertical adjustment of the flexible platen.
Figure 4A:
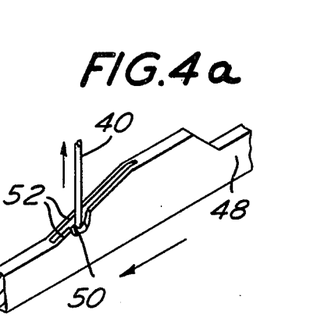
FIG. 4a is a closeup perspective view of the operational cam adjusting surface of the lever of FIG. 4.
Figure 5:
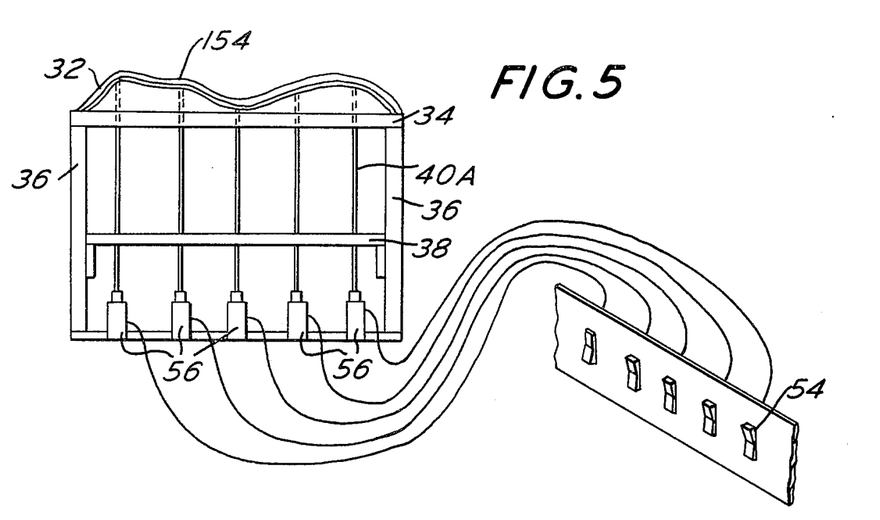
FIG. 5 illustrates electromechanical means for adjusting the various adjustment points of the flexible platen apparatus.

With reference to FIG. 3, if the adjustment levers 48 are to be placed in one plane, they can be inclined in the manner shown in the top view of FIG. 3. The levers are shown extending to each side of the flexible platen and are inclined in such a manner as to be readily accessible while the precise adjustment locations are equal distance from one another. The vertical adjustment rods 40 extend upwardly to the flexible platen 32. As shown in FIG. 4, each adjustment lever 48 has a camming surface 50 to engage the vertical adjustment rod 40 and as shown in FIG. 5, the adjustment rod 40 may be laterally secured by side ridges 52 of the lever member 48 which are positioned along the side of the camming surface 50. The adjustment of the flexible platen 32 must be retainable, thus the camming function must be fixedly carried out with due consideration given to the downward force exerted by the stretched platen 32 as it is adjusted upwardly.

In place of the inclined levers and camming function, any other suitable purely mechanical scheme may be utilized. For example, gear trains or other suitable linkages are contemplated and the adjustment means may extend outwardly from the platen apparatus in layers rather than in inclined planar fashion as shown in FIG. 3. Worm gears and other turnably operated means are also contemplated.

In place of the mechanical adjustment operation disclosed in FIGS. 2 through 4a, an electromechanical adjustment system such as schematically disclosed in FIG. 5 may be utilized. Control means 54 are shown which may be used to trigger standard pneumatic valves which are shown schematically as 56. Rods 40A are shown, however, which may be eliminated by placing the valve structure directly below the flexible platen 32.

Prior to operation, the apparatus must be set up and this can be done with conventional plotting equipment or with modified equipment as disclosed herein. In the setup operation, rigid board-like member 31, which is shown positioned below the projectors in FIG. 1, may be utilized. By conventional means, such as a field survey, landmarks are located and the actual elevations are determined for preferably four physical locations. In addition, one horizontal distance between known points is necessary.

If using conventional equipment for the setup means and by using standard photogrammetric red and blue glasses with the use of a standard dot platen, the horizontal and vertical data is utilized in the standard manner to provide an absolute control model setup. This setup process is standard and various techniques are fully covered in volumes 1 and 2 of the Manual of Photogrammetry published by the American Society of Photogrammetry.

Figure 9:
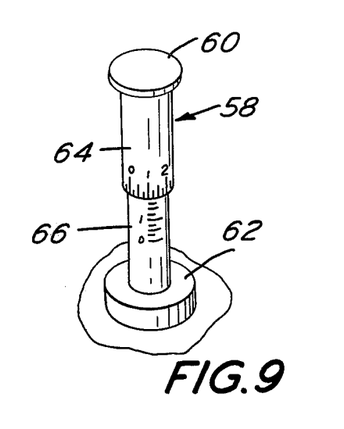
FIG. 9 is a perspective view of an adjustment platen which may be utilized in setting up the apparatus disclosed in FIG. 1.
Figure 10:
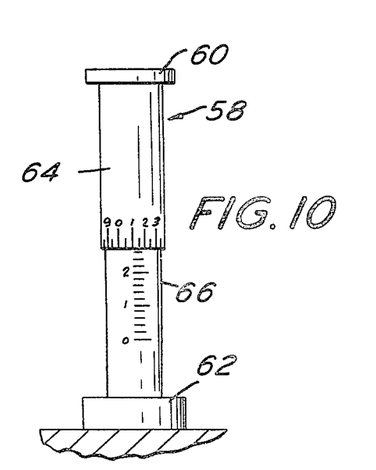
FIG. 10 is a side elevational view of the apparatus of FIG. 9.

In place of the standard reference table and conventional platen apparatus, the setup can be accomplished by utilizing the rigid table-like member 31 together with the unconventional platens 58 as shown in FIGS. 9 and 10. These platens 58 comprise a top surface 60 similar to the conventional 4"-diameter metal surface of the standard platen, and a base member 62 which is placed on table-like member 31 at the desired location of landmarks. The top of the platen 60 is vertically adjusted by means of the cylindrical unit 64 which threadably engages shaft 66. Scales, which may be on the platen itself, such as the vernier type of scale shown in FIGS. 9 and 10, may be utilized to provide the vertical distances necessary for the adjustment of the projectors. Once this vertical data is obtained, it may be utilized in the conventional manner to provide the necessary absolute control. Once this is accomplished, table-like member 31 may be removed from the unit of FIG. 1 by sliding it to the right over tracks 33 or it may be removed by other convenient means.

Once the setup has been accomplished, the operation of the apparatus is as follows: two of the three projectors 20, 22 and 24, once properly oriented, project the images from the two diapositives into the space above the flexible platen 32. The projectors utilized are preferbly standard double-projection direct-viewing projectors which have heretofore been conventionally used in photogrammetry. Each vertical adjustment rod 40, 40A of the flexible platen apparatus 28 is then operated either by mechanical, electrical or other means so that the flexible platen 32 itself is raised to overlay the image from one diapositive over the image from the other diapositive to form one complete image area, which occurs when the plotter operator observes that the blue-green images are seen to coincide to form the bluish-red combination, as occurs in the heretofore conventional manner. Once the entire surface is adjusted accordingly, the photograph can be taken by means of camera 26 with distortion-free planimetric orthophotographs or orthostereoscopic photographs resulting which can conveniently be enlarged to the desired scale. Many types of cameras may be used, such as Hasselblad with verichrome pan film being used for orthophotographs, and Ekatachrome-X film being used for orthostereoscopic photographs.

It will be appreciated that the flexible platen apparatus 28 can be designed to be interchangeable with a conventional tracing table, and accordingly may be used to replace or supplement conventional plotting.

Figure 6:
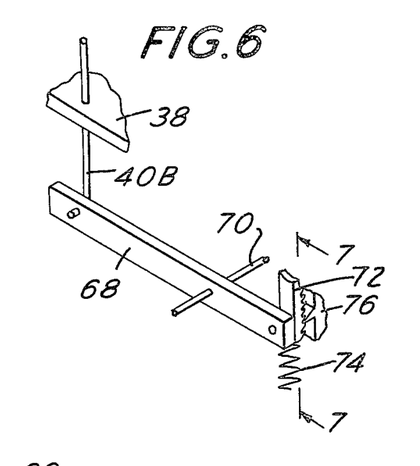
FIG. 6 is a perspective view of an alternate mechanical adjustment means for adjusting the flexible platen.
Figure 7:
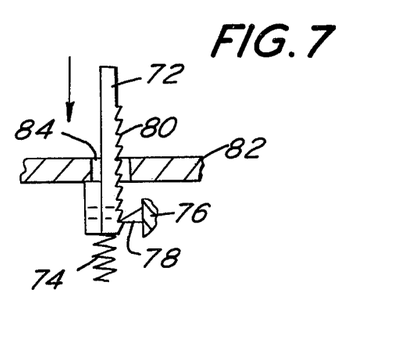
FIG. 7 is a side elevational view of the mechanism of FIG. 6.

With reference to FIG. 6, an alternate mechanical adjustment means for the flexible platen assembly 28 is disclosed. In place of the camming apparatus, rods 40B, which are similar in nature to rods 40 of FIG. 2, extend upwardly to the flexible platen surface 32 through the support member 38. The base of each rod 40B is secured to a member 68 which extends to the edge of the platen apparatus 28 or to a keyboard-type of arrangement together with all other such members. Bar member 70 schematically designates the pivot point which all members 68 have as they extend to the control position where they are each secured to an individual upright member 72. At the base of the connection, a spring 74 is shown which will tend to bias the upright member 72 upward by causing the rod 40B at the opposite end of member 68 to assume its lowest position, which normally will be when the flexible platen 32 is flat. As can be seen from FIG. 7, when downward pressure is exerted on upright member 72, the bias of spring 74 is overcome, and by means of lock member 76, the upright member 72 can be set in a series of depressed positions with locking tip 78 engaging one of the teeth 80 of the upright member. A positioner 82 is shown having sufficient space 84 through which upright member 72 extends to permit lateral motion of upright member 72, thus permitting the release of locking tip 78 from engagement with any of the teeth 80. It will be appreciated that FIGS. 6 and 7 are schematic in nature and that the disclosed mechanism of these figures may be utilized to form a compact control unit with punch keys, such as for a typewriter, whereby upon depressing the keys which would be joined to upright members 72, rods 40B are vertically raised until the desired adjustment position of the flexible platen 32 is reached. At this point, the member 72 is locked in position by locking tip 78 until such time as release is desired, which release is caused by imparting lateral motion to upright member 72 to be biassed to its rest position.

Figure 8:
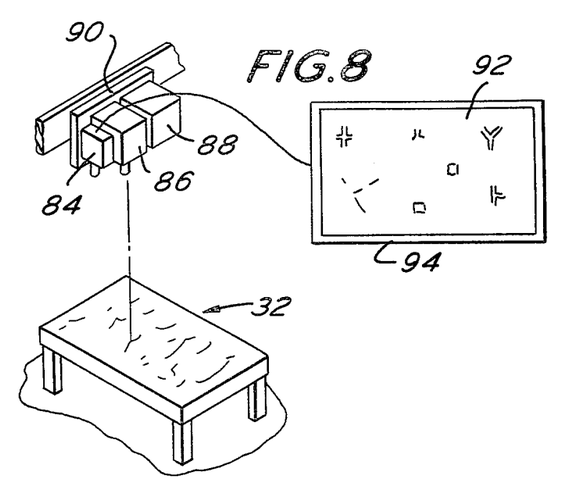
FIG. 8 is a schematic view of a video system which may be utilized in conjunction with a flexible platen.

With reference to FIG. 8, an alternate system is disclosed wherein a video system, as will be described, must be utilized. A flexible platen apparatus 32, which may be on the order as that described in FIG. 1 and succeeding figures, is shown positioned below a television camera 84, a slide projector 86, and a camera 88, all of which are mounted by mounting means 90 as schematically shown in FIG. 8. A TV screen 92 is shown which includes support element 94 to enable a transparent overlay to be positioned over the screen 92. It should be understood that the positioning of the elements as shown in FIG. 8 is not critical in the sense that the flexible platen 32 could also be positioned in a vertical manner instead of horizontally, as shown, with the TV camera 84, the projector 86, and the copy camera 88 all adjusted accordingly to receive from, and project images to, the flexible platen assembly 32, as the case may be.

Figure 11:
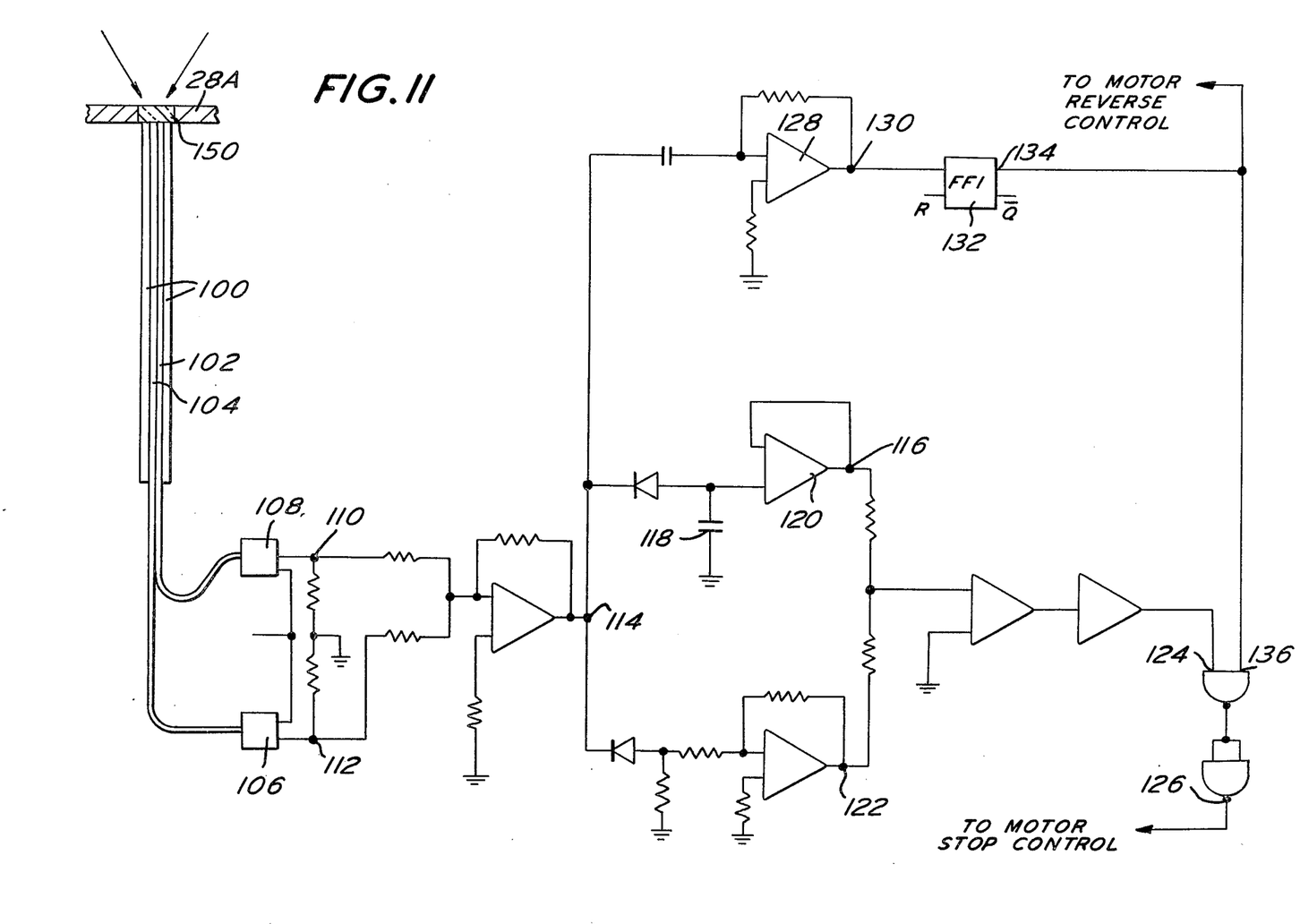
FIG. 11 is a schematic circuit diagram of a fiber optic system which can be utilized to adjust the flexible platen.
Figure 12:
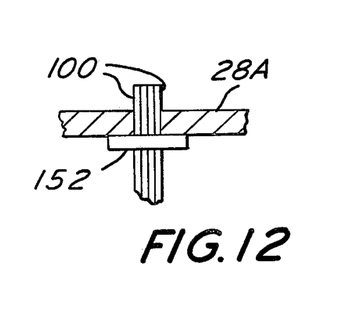
FIG. 12 is a side cross-sectional view of a portion of an alternative embodiment of the fiber optic system of FIG. 11.

In operation, a slide or print photo is placed into the projector 86 which projects the image to the surface of the flexible platen apparatus 32. Adjustments are made for the approximate horizontal control scale which depends on the scale of the print or slide and the distance that the projector 86 is from the flexible platen apparatus 32. An overlay sheet is made for the horizontal control data which is obtained from the U.S.G.S. topographical map, if used, or from field notes. The control must be laid out in scale with reference to the distance between the projector 86 and the flexible platen assembly 32. The overlay sheet is then placed against the TV screen 92. By means of TV camera 84, the image on the flexible platen assembly 32 is projected onto the TV screen 92. At this time, the adjustment means for the flexible platen 32 which may be mechanical means of FIG. 4 or FIGS. 6 and 7, the pneumatic means of FIG. 5, or the optical means as shown in FIGS. 11 and 12, which will be discussed, or any other means of adjustment, are now utilized to adjust the flexible platen assembly 32 to bring the photo images into alignment with the overlay control plotted data on the overlay which has been placed against the TV screen 92. Information from the photo images may now be traced onto the overlay to provide the overlay with all required data needed from the photo images.

In addition, a copy camera 88 may be set up to photograph the images on the flexible platen apparatus after the adjustments have been made to align the images and the control data. Thus, relatively distortion-free orthophotographs and orthostereoscopic photographs can be obtained.

With reference to FIG. 11, a fully automated platen adjustment means is shown in which fiber optic tubes and companion circuitry is used in place of the adjustment systems of FIGS. 4, 5 and 6. With the use of this fully automated system, the plotter operator does not have to observe the adjusting process and singularly adjust each of the series of rods 40, 40A or 40B until the requisite bluish-red combination is achieved. Rather, through the use of a power driven tube 100 containing a blue optical fiber 102 and a red optical fiber 104 and implementing circuitry, the bluish-red condition can be obtained at a multiplicity of points throughout a flexible platen. Thus, a flexible platen 28A of rubber-like material on the order of that disclosed in FIG. 1 is shown in FIG. 11. In place of each individual rod 40 as shown in FIG. 2, a motor driven tube 100 is utilized, each of which is controlled individually in the following manner.

Red light passes through fiber optic tube 104 with "Red" filter to photocell 106. Similarly, blue light passes through the fiber optic tube 102 with "Blue" filter to photocell 108.

Photocell 108 causes a voltage at terminal 110 proportional to the intensity of the blue light. Photocell 106 causes a voltage at terminal 112 proportional to the red light. These are summed, multiplied by a constant, and appear at terminal 114 as a negative voltage.

As the motor driven tube 100 is moved toward the apex or point of maximum intensity where the bluish-red condition is met, the voltage at terminal 114 will be increasing in magnitude. At the apex, this voltage is a maximum and will be stored at terminal 116. Capacitor 118 and amplifier 120 constitute a "maximum hold" circuit.

At this instant, the voltage of terminal 122 is also equal to that of terminal 116 so that the voltage at terminal 124 is essentially zero. This in turn assures that the voltage at terminal 126 will be zero.

As the motor drive tube 100 passes through the apex, the light intensity and consequently the voltage at terminal 114 will begin to decrease. This will cause two things to happen. First, the voltage at terminal 122 will decrease while that of terminal 116 will not. This in turn will cause a negative voltage to appear at terminal 124, but this will have no effect upon the voltage at terminal 126 which is already zero. Second, it will sense the positive slope of the voltage at terminal 114 and will cause differentiator 128 to have a negative output on terminal 130. This will in turn set flip-flop 132 causing a positive potential to appear at terminal 134. A positive signal is thus sent to terminal 136 and to a motor reversing control as shown.

When the motor (not shown) reverses, it will drive the movable tube 100 back toward the apex. As it does, the voltage at terminal 122 will increase and when it becomes very slightly larger than the voltage at the memory output terminal 116, the voltage at terminal 124 will reverse in polarity, and now since terminals 124 and 136 are both positive, terminal 126 will become positive sending a signal to the motor stop control. By this means, the motor driven tube 100 is positioned at the apex and will remain there.

A reset button (not shown) is needed to return the motor to its reset condition, reset flip flop 132 by applying an appropriate voltage to its R terminal, and discharge capacitor 118 by shorting it momentarily.

Thus, each motor driven tube 100, once actuated, will adjust itself to satisfy the bluish-red condition and accordingly, the entire flexible platen surface will assume the correct elevations to create a stereo model representative of the actual terrain.

In FIG. 11, above the motor driven tube 100, a transparent window 150, as contrasted to the platen 28A which is opaque, it utilized above the motor driven tube 100, which may or may not be attached thereto, to permit the projected light to reach the optical fibers 102, 104. A window 150 is provided for each tube 100.

In an alternate embodiment, as shown in FIG. 12, the tubes 100 may penetrate through the opaque flexible platen 28A and be secured in place relative to the platen by rings 152.

With further reference to FIG. 5, form or other substance may be sprayed or otherwise applied to the flexible platen 32 after it has been adjusted to form the distortion-free stero model. The foam or other substance will harden to form a permanent relief model 154 which can be removed from the apparatus 28 when the flexible platen 32 is returned to its flat condition. Such a model 154 has a wide variety of uses, such as for planning construction and mining operations, and because of its accuracy, can be relied on for detail evaluations such as cost estimates for earthwork operations.

In view of the above, the present invention may be embodied in other specific forms without departing from the spirit or essential attributes thereof and, accordingly, reference should be made to the appended claims rather than to the foregoing specification as indicating the scope of the invention.

I claim

1. Photogrammetric apparatus which provides a receiving surface upon which distortion free images may be created thus enabling the production of work products in which distortion has been eliminated comprising:
   image projection means;
   a flexible stretchable platen of a size sufficient to receive images projected thereon by said image projection means;
   means of adjusting the level of a plurality of surface points of said flexible platen responsive to said images achieving a predetermined condition; and
   means of retaining the achieved level of adjustment of a plurality of surface points of said flexible platen to produce a stereo model onto which distortion free images are being projected.

2. The photogrammetric apparatus of claim 1 further including a camera positioned above said flexible platen to photograph projected images from said image projection means as appear on said flexible platen once adjusted by said adjustment means.

3. The photogrammetric apparatus of claim 1 wherein said adjustment means is mechanical.

4. The photogrammetric apparatus of claim 3 wherein said adjustment means comprises:
   movable vertical members extending to said flexible platen from positions beneath said flexible platen;
   movable horizontal lever members engageable with said vertical members and
   means for translating horizontal movement of said horizontal members to cause vertical movement in said vertical members.

5. The photogrammetric apparatus of claim 4 wherein said means for translating horizontal movement comprises inclined surfaces connected to said horizontal lever members, said movable vertical members being engageable by said inclined surfaces.

6. The photogrammetric apparatus of claim 1 wherein said adjustment means comprises electromechanical means.

7. The photogrammetric apparatus of claim 1 wherein said adjustment means comprises fully automated electronic means.

8. The photogrammetric apparatus of claim 7 wherein said fully automated electronic means comprises a driven tube containing optical fibers, and includes means to stop said driven tube when a predetermined condition is met.

9. The photogrammetric apparatus of claim 1 wherein said flexible platen comprises a piece of rubber-like material supported in a plurality of places by support means.

10. The photogrammetric apparatus of claim 1 wherein said means of adjusting the level of each of a plurality of surface points of said flexible platen comprises linkage, spring biased to cause attainment of one level for each of said surface points and further includes means of overcoming said bias to cause said linkage to adjust the level of each of said plurality of surface points; and wherein the means of retaining the achieved level of adjustment for each of the plurality of surface points comprises teeth on a part of said linkage and further includes a locking member engageable with said teeth whereby when said locking member engages one of said teeth an achieved level of adjustment of one of said surface points will be retained.

11. Apparatus for eliminating distortion in photographs comprising:

image projection means for projecting images of photographs which contain distortion;

a flexible platen of a size sufficient to receive images projected thereon by said image projection means;

support means for said flexible stretchable platen including support members engageable with said platen at a plurality of locations; and means of adjusting the support members to adjust the surface positions of said plurality of locations of said flexible platen to form a total image area whereby at each of said locations images are received distortion free.

12. The apparatus of claim 11 wherein said image projection means comprises double-projection direct-viewing plotting instrumentation in which two projectors are utilized to project and illuminate diapositives and wherein said flexible platen is adjusted responsive to conditions created by the combination of the illumination of said diapositives.

13. The apparatus of claim 12 wherein said flexible platen is supported formally by a peripheral support means in addition to said support members which are centrally disposed.

14. The apparatus of claim 13 wherein said central support members are of equal distance from each other.

* * * * *